Aug. 11, 1953 — M. E. BOWERS — 2,648,307
CHICKEN CHUTE
Filed Aug. 9, 1950 — 2 Sheets-Sheet 1

INVENTOR.
MAURICE E. BOWERS
BY
*Leon Edelson*
ATTORNEY

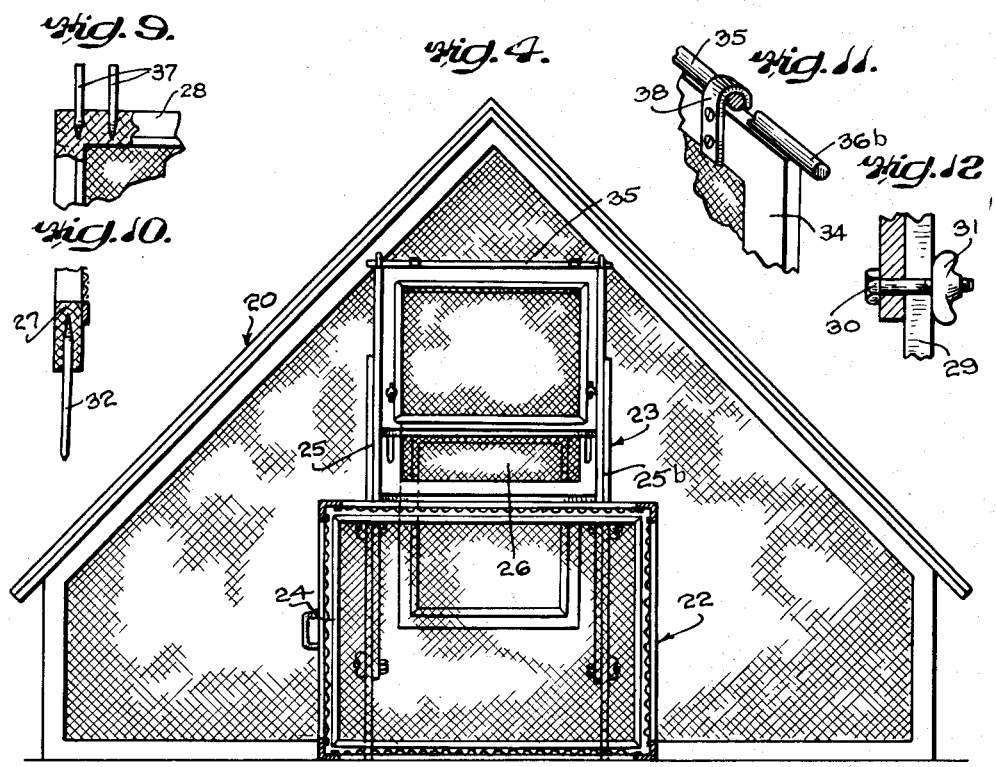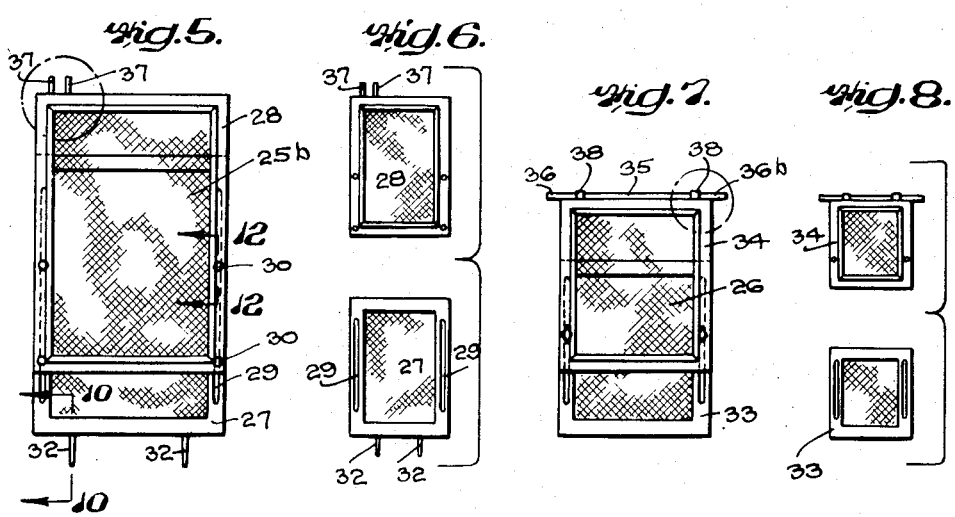

Patented Aug. 11, 1953

2,648,307

UNITED STATES PATENT OFFICE 2,648,307

CHICKEN CHUTE

Maurice E. Bowers, Somerville, N. J.

Application August 9, 1950, Serial No. 178,437

2 Claims. (Cl. 119—82)

1

This invention relates generally to apparatus for the handling of poultry and more particularly to an improved construction of portable runway designed for installation between a brooder house and a catching crate for the poultry.

In the business of raising poultry it often becomes necessary to handle a large number of birds, such as for vaccinating or for other purposes. This service is often performed by a crew of skilled men. In the performance of this service, the crew generally comes equipped with a crate which is designed to admit the entry of a large number of birds. These birds are then removed from the crate, one at a time, preferably by an assistant, and handed to the person who administers the vaccine. It is common practice now to place one end of the crate against the open door of a hen house, such as the brooder house, laying house, or some other shelter, and permit or drive the birds from the shelter into the crate. In many arrangements the level of the ground outside the hen house is considerably below the level of the exit from the hen house or the like, and the matter of transferring the birds from the shelter or hen house into the crate often presents a troublesome problem.

The present invention aims to provide a simple, rugged, knock-down or collapsible construction of simple elements which may be temporarily installed to provide a corridor between the exit in the hen house and the entrance into the crate.

Another object of the invention is to provide a poultry runway which is readily set up and is adjustable for use with almost any existing poultry shelter and its associated catching crate. A still further object of the invention is to provide a set of simple structural units which may be easily set up to provide a corridor or runway which is firmly but temporarily anchored in the ground between the poultry shelter and a catching crate.

Other objects and advantages of the present invention will be apparent to persons skilled in the art from the following specifications and the accompanying drawings which serve as an illustrative embodiment of the invention; it being understood that variations thereof falling within the scope of the appended claims may be devised from time to time without departing from the general principles or real spirit of the invention.

In the drawings:

Figure 4 is a view taken on the line 4—4 of Figure 2;

Figure 5 is an elevational view of one of the side wall assemblies;

Figure 6 shows on a reduced scale the panels of Figure 5 disassembled;

Figure 7 is a reduced plan view of the roof assembly;

Figure 8 shows the panels of the roof assembly on a reduced scale and in separated relation;

Figure 9 is an enlarged detail of the portion indicated by the dot and dash circle of Figure 5;

Figure 10 is a detail view taken on the line 10—10 of Figure 5;

Figure 11 is an enlarged detail of the portion embraced within the dot and dash circle of Figure 7; and Figure 12 shows the manner of assembling and securing in fixed relation the extensible panel sections of the side and roof assemblies.

Figure 1:
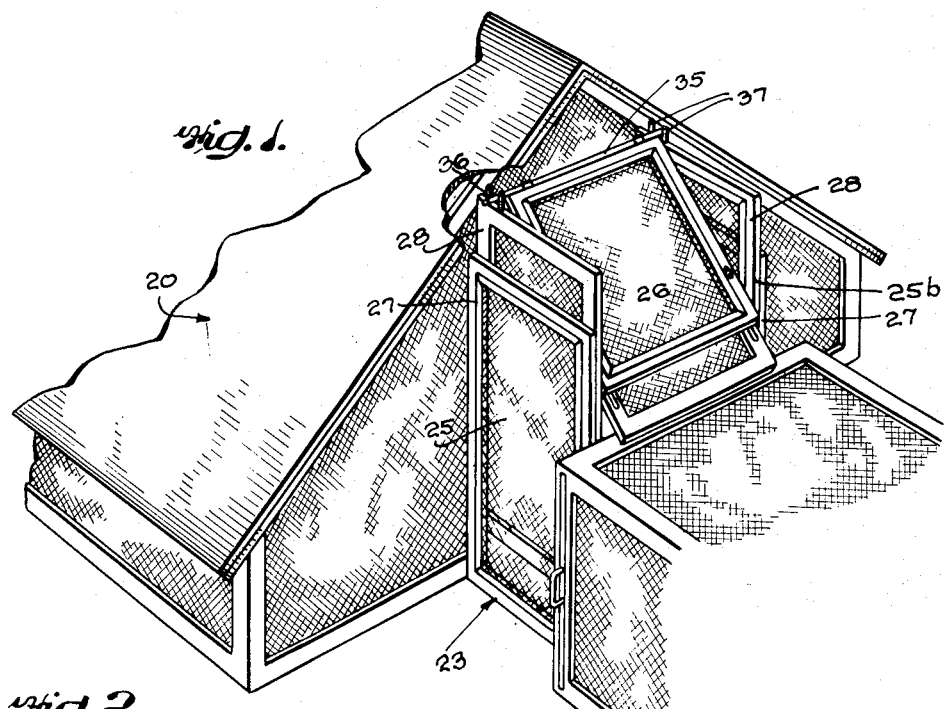
Figure 1 is a perspective view of the end of a hen house or the like, showing one end of the receiving crate and the temporary corridor between the exit from the hen house and the entrance to the crate.

The hen house 20 in the drawings, which is designed to illustrate any housing for hens or other fowl, is provided with a door 21 which may be swingable or slidable as desired to normally close the entrance and exit opening 21b of the hen house. The crate 22 is designed to receive a suitable number of birds. After the birds have entered the crate 22 the performance of the vaccination or other operations upon the birds is facilitated. Having gathered a substantial number of such birds in the crate, the person who administers the vaccine or his assistant reaches in and seizes a bird, performs the desired operation thereon, and the bird is then freed upon the ground.

The present invention is particularly directed to a collapsible structure indicated generally by the reference character 23, which is interposed between the shelter 20 and the receiving crate 22 in such a manner as to embrace the door opening 21b and provide an enclosed corridor or runway leading from the opening 21b of the shelter house to an opening 23b in the end of the catching crate 22. Preferably, the opening 23b into the catching crate is normally closed by a slidable door 24. When both doors 21 and 24 are opened the birds will enter the receiving crate 22 and after the desired number of birds are admitted the door 24 of the crate is closed. After all of the birds are operated upon, the corridor 23 may be disassembled and then set up at the outlet of another hen house shelter or the like.

The collapsible runway or corridor 23 of the present invention comprises a pair of side wall assemblies 25—25b and a roof assembly 26. For convenience and for best operation, each of these assemblies consist of two slidable panel sections which may be relatively adjusted to the desired height or length to suit the existing conditions of a particular installation. Thus, the side wall assemblies 25—25b each consist of a pair of screened frames 27 and 28, one of which is provided with a pair of elongated slots 29—29 in its opposite side rails, while the other is provided with a pair of bolts 30—30 in its opposite side rails which respectively enter and pass through the slots 29—29, each bolt 30 being provided with a wing nut 31 for firmly holding the frames 27 and 28 together in their adjusted relation.

The bottom frame 27 of each of the side wall assemblies is provided with a pair of laterally spaced spikes 32 at its lower edge, these spikes being adapted to be driven into the ground to securely hold the side wall assembly in substantially vertically extending position with one of its edges abutting against the front wall of the housing 20.

The roof assembly 26 also preferably consists of a pair of slidably adjustable screened frames 33 and 34, one of which is provided with elongated slots and the other with the bolts and wing nuts as previously described and illustrated in Figure 5 of the drawings so that the two sections 33 and 34 may be longitudinally adjusted to a length equal to the distance between the top of the crate 22 and the front wall of the housing 20.

The lower or frontal edge of the frame 33 of the roof assembly 26 is designed to rest upon the top of the crate 22 as shown, while the upper or rear edge of the frame 34 is provided with a rod 35 the opposite ends 36—36b of which project freely beyond opposite sides of the frame 34 to provide a pair of hinge pins. The top edge of each of the frames 28—28 of the side wall assemblies 25—25b is provided with a pair of spaced vertically extending pins 37—37, these latter being designed to receive therebetween the freely projecting hinge pins 36—36b of the roof assembly. As shown in Figure 11, the hinge pin rod 35 is preferably secured to the edge of the frame 34 by a pair of clamp elements 38—38 suitably fastened to the frame by screws or the like.

Figure 2:
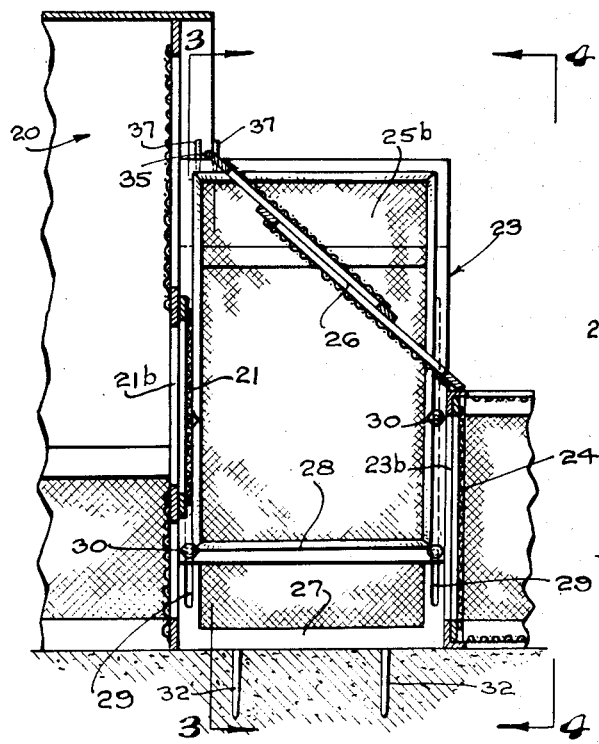
Figure 2 is a sectional view taken on the line 2—2 of Figure 3.
Figure 3:
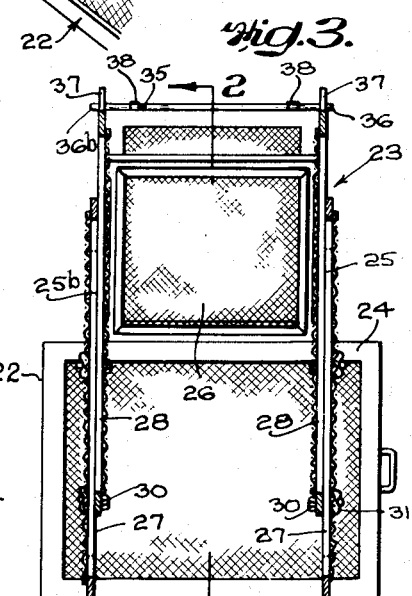
Figure 3 is a view taken on the line 3—3 of Figure 2.

In use, the side wall assemblies 25—25b are adjusted to the desired height and are driven into the ground, one on each side of the door opening 21b of the hen house, the side wall assemblies being positioned in substantially parallel relation. The crate 22 is then positioned with its end wall abutting and extending transversely of the outer vertical edges of the side wall assemblies 25—25b, following which the roof assembly 26 is hinged to the upper rear corners of the side wall assemblies and adjusted to length to permit its outer edge to freely rest upon the top of the crate, as best shown in Figures 1 and 2.

The present corridor, therefore, is adaptable to substantially all conditions that may be found on the farm and it readily facilitates the transfer of the birds from the bird house to the receiving crate.

What is claimed as new and useful is:

1. A chicken chute for use between a brooder and a crate, said chute comprising two substantially vertical side walls and a roof extending therebetween, each of said side walls comprising a pair of screened frames in adjustable face to face engagement, said side walls having adjacent the bottom portions of the lowermost of said frames ground penetrating means and on complementary top corner portions of the uppermost of said frames a pair of opposed bearing means, said roof comprising a pair of screened frames in adjustable face to face engagement and having along an end of one of said frames oppositely projecting pivot members respectively removably received by said bearing means whereby said chute may abut a side of each said brooder and crate and form a closed passage between openings in said sides of the brooder and crate regardless of the positions of said openings.

2. A chicken chute for use between a brooder and a crate, said chute comprising two substantially vertical side walls and a roof extending therebetween, each of said side walls comprising a pair of screened frames in adjustable face to face engagement, said side walls having adjacent the bottom portions of the lowermost of said frames ground penetrating means and on each of a pair of complementary top corner portions of the uppermost of said frames a pair of spaced pins, said roof comprising a pair of screened frames in adjustable face to face engagement and having on an end of one of said frames a pair of oppositely extending pins respectively removably received between the aforesaid paired spaced pins whereby said chute may abut a side of each said brooder and crate and form a closed passage between openings in said sides of the brooder and crate regardless of the positions of said openings.

MAURICE E. BOWERS.

References Cited in the file of this patent

UNITED STATES PATENTS

| Number | Name | Date |
|---|---|---|
| 140,674 | Boughton | July 8, 1873 |
| 932,355 | Thrasher et al. | Aug. 24, 1909 |
| 1,462,107 | Holman | July 17, 1923 |
| 1,737,073 | Boldt | Nov. 26, 1929 |
| 1,950,603 | Fischer | Mar. 13, 1934 |

FOREIGN PATENTS

| Number | Country | Date |
|---|---|---|
| 23,430 | Great Britain | 1908 |